2,872,390
Patented Feb. 3, 1959

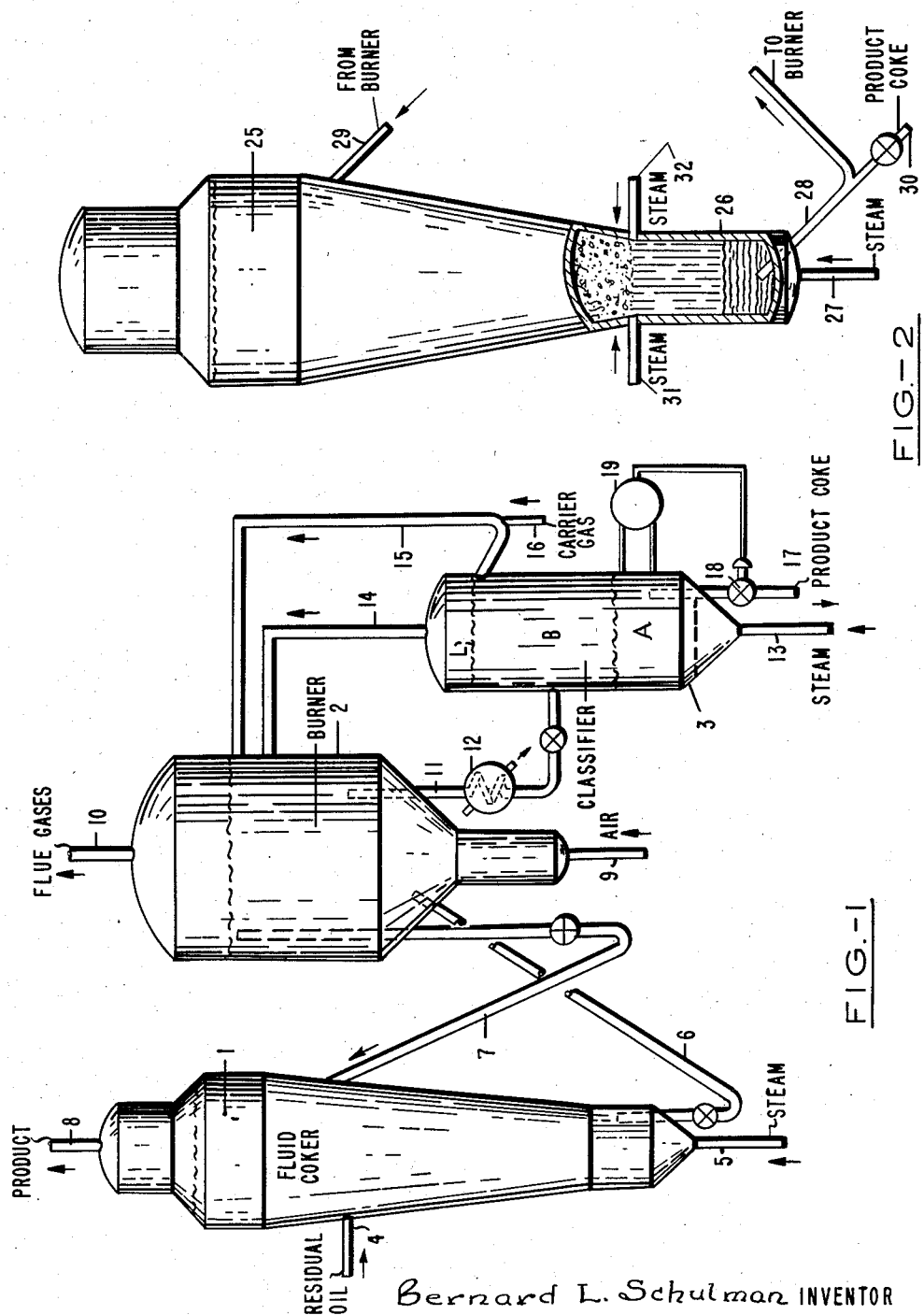

2,872,390

CLASSIFICATION OF PARTICULATE SOLIDS IN FLUID COKING

Bernard L. Schulman, Roselle, N. J., assignor to Esso Research and Engineering Company, a corporation of Delaware Application June 7, 1954, Serial No. 434,732

2 Claims. (Cl. 202—14)

This invention pertains to the art of classification of solids. More particularly, the invention concerns a method and apparatus for preferentially withdrawing coarse solids from a fluid solids system, specifically, from a petroleum oil fluid coking system.

The present invention is predicated upon the discovery that it is possible to cause coarse solids to settle out of or segregate from a dense phase, partially fluidized bed of particulate solids having a minimum size distribution by adjusting the fluidizing or aerating gas velocity within certain critical limits.

Recently it has been proposed to coke hydrocarbon oils such as pertoleum residua by injecting them into a coking vessel containing a fluidized bed of high temperature finely divided solids, e. g. coke, sand, pumice, spent catalyst and the like. In the coking vessel, the oil undergoes pyrolysis in the fluidized bed, evolving lighter hydrocarbons and depositing carbonaecous residue on the solid particles. The necessary heat for the pyrolysis is supplied by circulating a stream of the solids through an external heater, generally a combustion zone, and back to the coking vessel. The solids, which have had carbon deposited on them during the coking, are partially combusted in the heater thereby raising the temperature of the solids 100–300° F. above the temperature of the solids in the coking vessel.

By application of the method of the present invention to a petroleum oil fluid coking system, certain advantages are obtained. Coarse coke is preferentially withdrawn, according to this invention, either as product or to be burnt to supply heat for the pyrolysis, whereby the necessity of supplying new nuclei for coke deposition, or "seed," is greatly reduced and whereby an optimum particle size distribution is more readily maintained, leading to optimum coker performance.

In its broader aspects, however, the present invention is applicable to any process wherein it is necessary to separate particulate solids according to size and/or density.

Thus it is also applicable to fluidized solids systems wherein a material or "shot" heavier and/or denser than the solids in the fluidized reaction bed is circulated through the bed to supply heat. As an example, it has been proposed to utilize the "shot" circulation method of heating to supply heat to a coking process. In such processes, the shot may be passed downwardly through the coking bed or may be contacted with the coke particles upon which coke deposition occurs in a separate heat exchange zone. The present invention is admirably suited to the separation of the shot from the coke particles prior to its circulation to a heating zone.

Previously, it had been supposed that it was a characteristic of a fluidized solids bed that little or no particle segregation occurred because of the turbulence caused by the fluidizing gas. Now it has been discovered that the holdup or concentration of a certain sized particle in a fluidized bed is dependent for a stable system upon the settling velocity of that particle in the bed and, in addition, the rate at which the particle is picked up at the bottom of the bed and mixed back into the bed, or "backmixed." For a solids system, wherein the solids are circulated to and from a fluidization vessel, the feed rate of the specified size of particles to the bed and the withdrawal therefrom must also be considered.

The settling velocity varies in a way that can be predicted by using a form of Stokes law and depends mainly upon size and density of the particles, fluidizing gas velocities and bed densities. Accordingly, an effective bed viscosity may be determined, i. e. a measure of resistance to the settling of a certain sized particle. The viscosity of a bed decreases with increasing fluidizing gas velocities due to the greater dispersion of the solids in the bed, particularly before the point of true fluidization where gas bubbles are formed. Also, the settling velocity of a certain sized particle will decrease with increase in concentrations of that size of particle and there is consequently a critical concentration or maximum possible settling rate.

The rate of back mixing of a particle from the bottom of a bed increases rapidly, almost exponentially, with fluidizing gas velocity, particularly when the fluidizing gas velocity exceeds about 60% of the minimum fluidizing velocity of the particle. As the gas velocity increases, not only is the terminal fall velocity of the particle approached but the density of the bed is decreased, thus offering less resistance to back mixing.

Assuming a solids bed having only two sizes of particles, each size of particle will have rather definite, different settling velocities and rates of back mixing. As the size and density of each of the groups of particles approach being equal, so will the settling velocities and rates of back-mixing tend to become equal. There is, consequently, a size distribution of particles for which it is impossible from a practical standpoint to cause a separation to occur by fluidization. Also, there is a practical lower and upper limit to the range of superficial velocities of fluidizing gas allowable to cause segregation in a fluidized bed even when there exist a fairly wide size distribution of particles. The lower limit is, of course, that velocity necessary to give some mobility to the bed. The upper limit of gas velocity is determined by the velocity at which the rate of back-mixing exceeds the settling velocity.

This invention is, therefore, particularly applicable to the classification of a mass of solids having a median particle size in the range of 150 to 500 microns (by screen analysis), and having at least a portion of solids with a size two times the median particle size.

The fluidization gas velocities used in the practice of this invention will lie within a range of velocities having as a lower limit a velocity of 75 to 95% of the minimum fluidization velocity, hereinafter defined, of the mass of solids being classified and a velocity of 200 to 250% of the minimum fluidization velocity as the upper limit.

From the Carmon-Koseny equation [1] it is possible to calculate the pressure drop over a bed of particulate solids for given gas velocities. The minimum fluidization velocity of a bed is defined as that velocity at which the calculated pressure gradient over the bed equals the bulk density of the bed. If the surface area of the particles in the

[1] $\dfrac{6(P/L) \times g c \rho_f E^3}{G^2 a} = f$ $P/L$=pressure gradient through bed
$gc$=units conversion factor
$\rho_f$=fluid density
$E$=fraction voids
$G$=mass rate of flow, based on superficial cross-sectional area
$f$=friction factor, a function of the Reynolds number
$a$=surface area of particles per unit volume of packed space
$a=6\dfrac{(1-E)}{Dp}$; where $Dp$=sphere diameter (See Micromeritics, J. M. Dallavalle, p. 272, 1948, Pitman Publishing Company.)

bed is calculated by assuming uniform size particles, then, theoretically, particles above the assumed size should fall out of the bed and particles finer than the assumed size should be entrained out of the bed at minimum fluidization velocities of the assumed size. But, by reason of the turbulence of the bed, practically all the particles within a wide range of sizes of the assumed size are fluidized and about 50% of the particles of the assumed size will entrain for a time and about 50% will fall out for a time. If segregation of the fluidized mass does occur, about 50% of the particles of the assumed size will be in the upper phase and about 50% in the lower phase.

It is necessary, therefore, to properly select fluidization velocities to secure a desired separation when a mass of particulate solids permits of a separation. If it is desired to substantially eliminate from a mass of solids all particles greater than say X microns in size by having them settle out of the bed, then superficial fluidizing gas velocities must be used that correspond to the minimum fluidization velocity of particles of smaller diameter, Y microns. Usually, in order to secure the desired settling out, X must be at least 1.10 to 1.25 times Y.

Stated differently, the solids mixture must be aerated above its minimum fluidizing velocity, preferably 2-2.5 times above, calculated on the basis of median particle size, in order to separate coarse solids from the mixture.

It becomes apparent from the above discussion that in certain fluidized systems using very small and relatively closely sized particles, such as systems for catalytically cracking hydrocarbon oils wherein the median particle size may be about 80 microns, no or very little segregation occurs, particularly when proper fluidization gas velocities are used, as the minimum fluidizing velocities for such a system are only about 0.008-0.015 ft./sec., which makes accurate control of velocities difficult for the purposes of this invention.

In petroleum oil fluid coking systems there is a relatively wide size distribution of the heat-carrying, inert, particulate solids because of their accretion in size by the carbon deposition on them. Consequently, such a fluid solids system lends itself to the method of this invention. In such systems minimum fluidization velocities of 0.075 to 0.2 feet per second are customary. Particle size of the solids is preferably between 40 to 500 microns and generally will not exceed 1000 microns.

The present invention should be distinguished from elutriating systems wherein the classification occurs in a dilute phase or suspension. In such dilute phase systems, the solids generally take up less than 5% of the volume whereas in the present the solids make up at least 50-60 volume percent of the gas solids suspension.

This invention will be more clearly understood from the ensuing description of the drawings attached to and forming a part of this specification.

In Figure 1 there is diagrammatically portrayed a preferred embodiment of the present invention adapted to be used in conjunction with a hydrocarbon oil fluid coking system wherein the classification vessel receives unclassified coke from and discharges fine coke to the burner or combustion vessel.

In Figure 2 there is shown a modification of this invention wherein the classification is carried out in a zone located in the fluid coking vessel.

Referring to Figure 1, there is shown a conventional fluid coking vessel 1 having as auxiliary equipment a burner or heating vessel 2 and a classification vessel 3. The method of this invention may be applied to any fluid coking process. Because the coking process is well known by the art, it will be but briefly described.

The oil to be upgraded, such as a residual oil, is injected into the coking vessel by line 4. The coking vessel contains solids of about 40-500 microns (screen analysis) in size. The solids are fluidized by steam admitted to the base of the vessel by lines 5 in amounts sufficient to create fluidizing gas velocities in the range of 0.1 to 5.0 ft./sec.

A portion of the solids in the coker is circulated to the combustion vessel 2 and back via lines 6 and 7 respectively to maintain the fluid bed at a coking temperature in the range of 900°-1600° F. The injected oil undergoes pyrolysis upon contact with the solids, evolving considerable quantities of vapors and depositing carbonaceous residue on the solids. The vapors are removed overhead by line 8 and may be subjected to further processing, such as fractionation, blending, hydrofining, hydrodesulfurization, etc.

Air or other free oxygen-containing gas is admitted to the base of the burner vessel by line 9 to fluidize the solids therein and to partially burn them whereby their temperature is raised to about 1000°-1800° F. Flue gases are taken overhead from the burner vessel by line 10.

Although the coke to be removed as product may be withdrawn from any place within the coking system, in this example the solids are withdrawn from the burner vessel by line 11 and transferred to the classification vessel 3. As the solids have high temperature, they are cooled by heat exchange means 12, prior to their entrance into the classification vessel.

The classification process can, of course, be operated intermittently or continuously. Fluidizing gas such as steam is admitted to the base of the vessel by line 13 in controlled amounts such that the ascending steam will have velocities within the ranges previously described. A relatively coarse, non-fluidized layer of relatively coarse coke particles forms in the lower portion (a) of the vessel and above this non-fluidized layer, a layer (b) of relatively fine fluidized particles is formed having an upper pseudo-liquid level L. The gasiform medium having passed through these layers is removed from the classification vessel by line 14 and is transferred to the combustion vessel.

Fine particles are decanted from the upper layer by line 15 and are conveyed to the burner vessel. A carrier gas such as steam or air is admitted to line 15 by line 16 to convey the particles. Of course, other means of withdrawing the fine solids may be used if desired. For example, the solids may be entrained in the gasiform medium by increasing the velocity of that medium as it passes through the pseudo-liquid level of the upper layer.

Coarse product coke is withdrawn from the lower layer by line 17. This withdrawal may be made intermittently or continuously. A preferred arrangement for withdrawing the coke is to operate control valve 18 in line 17 in conjunction with the liquid level controller 19.

Referring now to Figure 2, there is shown a coking vessel 25 similar to that depicted in Figure 1. The lower portion 26 of the vessel is modified to contain a dense phase classification zone operated in accordance with the teaching of this invention. The fluidized solids from the main coking zone descend into the classification zone wherein they encounter an aerating gas, such as steam, admitted by line 27, having a controlled velocity. The coarser fraction of the particles settles in the lower region of the classification zone and is removed by line 28. The contents of line 28 are preferably circulated to the burner to be heated therein and returned to the coking process by line 29. A portion of this coarse coke can be removed by line 30 as product.

In the classification zone the finer portions of the solids are continuously conveyed upwardly and returned to the coking bed. Additional quantities of steam are admitted by lines 31 and 32 to increase the velocity of the ascending vapors to the proper fluidization velocity, e. g., 3 ft./sec.

Thus it is apparent that the steam used for classification in example of Figure 2 is subsequently used as fluidization gas in the main coking zone.

As an example of the separation obtainable by the method of this invention, coke from a hydrocarbon oil fluid coking system was aerated in a straight-walled vessel of 4 inches I. D. At a superficial gas velocity of about 0.12 feet per second which was 75% of the minimum fluidization velocity based upon median particle size, the fine coke rose slowly to the top of the bed leaving the coarse coke behind. When the gas velocity was raised to 0.15 ft./second, the separation was rapid and a steady state was reached in less than one minute in a 1 ft. bed. Above about 0.3 ft./sec. (200% of the minimum fluidizing velocity), nearly all the coarse coke was picked up and backmixed into the fluid bed. The analyses of the original coke mixture and their resulting top and bottom layers when the aeration gas velocity was 0.2 ft./sec. is given in Table I.

*Table I*

|  | Original | Top Layer | Bottom Layer |
|---|---|---|---|
| Wt. Percent of Coke on 30 Mesh | 16.2 | 4.7 | 22.0 |
| Through 30 on 40 Mesh | 17.0 | 10.7 | 24.0 |
| Through 40 on 50 Mesh | 32.2 | 28.2 | 35.4 |
| Through 50 on 60 Mesh | 12.8 | 18.0 | 10.8 |
| Through 60 on 80 Mesh | 15.0 | 22.3 | 6.1 |
| Through 80 | 6.8 | 16.1 | 1.7 |

The median diameter of the top layer was approximately 270 microns while that of the bottom layer was 400 microns. The entire amount of extremely coarse material greater than about 840 microns settled completely out in the bottom layer, none being found in the upper fluid layer. This example shows that effective separation of the particles may be obtained by the method of this invention.

It is to be appreciated that the classification system proposed by this invention greatly reduces the amount of aerating gas that must be used to secure a given degree of separation. In a dilute phase elutriation system, the solids flow rate may be as low as 0.4 lb. of solids per cubic foot of aeration gas, whereas in the dense phase classification system of the present invention as much as 100 lbs. of solids can be classified per cubic foot of aeration gas.

Modifications of the present invention will be readily apparent to those skilled in the art. As an example, multiple arrangements may be used to classify the solids similar in design to conventional distillation columns.

Having described the invention, what is sought to be protected by Letters Patent is succinctly set forth in the following claims.

What is claimed is:

1. A method of preferentially withdrawing coarse coke product from a hydrocarbon oil fluid coking process wherein a mass of coke produced by said process substantially under 1000 microns in size is used as a heat carrying medium, comprising withdrawing coke from said process, introducing the coke so withdrawn into a classification zone, passing a gasiform medium upwardly through said zone at a superficial velocity less than 0.3 ft./second and corresponding to the minimum fluidization velocity of a coke particle 0.8 to 0.9 times the size of the smallest coke particle desired in said coarse coke product whereby a dense phase bed of particles composed of an upper relatively fine particle containing layer and lower, coarse particle-containing non-fluidized layer is formed, withdrawing from said upper layer relatively fine particles, returning said relatively fine particles to said process and withdrawing relatively coarse coke from said lower layer as said coarse product coke.

2. An improved hydrocarbon oil fluid coking process wherein coke particles produced by the process are the contact solids used, said coke particles having a size under 1000 microns, and a true density above 60 lbs./cu. ft., a portion of said coke particles having a particle size at least 2 times the median particle size of said coke particles, said median particle size being in a range within the limits of 150 to 500 microns, which comprises maintaining a fluidized coking bed of said coke particles in a coking zone at a coking temperature, injecting an oil into said coking zone to form vapors and coke which is deposited on said coke particles becoming a part thereof, maintaining a fluidized burning bed of said coke particles in a combustion zone at a combustion temperature, circulating coke particles between said coking bed and said burning bed to maintain said coking temperature, maintaining a mass of said coke particles in a classification zone, the coke particles of said mass being of less than 1000 microns in diameter and occupying over 50 volume percent of said mass, circulating coke particles from said burning bed to said mass, aerating said mass with an aeration gas at a superficial gas velocity less than 0.3 ft./second and corresponding to the range of 0.75 to 2.5 times the minimum fluidization gas velocity of said mass based on said median particle size thereby causing said mass to separate into an upper fluidized portion composed predominately of particles finer than said median particle size and a lower nonfluidized portion composed predominately of particles larger in size than said median particle size, returning coke particles from said upper portion to said combustion zone, and withdrawing coke particles from said lower portion as product of the process, whereby coke particles of seed size are conserved in said process.

References Cited in the file of this patent

UNITED STATES PATENTS

| | | |
|---|---|---|
| 1,983,943 | Odell | Dec. 11, 1934 |
| 2,421,840 | Lechthaler et al. | June 10, 1947 |
| 2,423,813 | Lechthaler et al. | July 8, 1947 |
| 2,483,435 | Barr | Oct. 4, 1949 |
| 2,557,680 | Odell | June 19, 1951 |
| 2,561,396 | Matheson | July 24, 1951 |
| 2,563,086 | Verschoor | Aug. 7, 1951 |
| 2,586,818 | Harms | Feb. 26, 1952 |
| 2,606,144 | Leffer | Aug. 5, 1952 |
| 2,631,921 | Odell | Mar. 17, 1953 |
| 2,666,526 | Odell | Jan. 19, 1954 |
| 2,683,685 | Matheson | July 13, 1954 |
| 2,709,676 | Krebs | May 31, 1955 |
| 2,711,387 | Matheson et al. | June 21, 1955 |